Dec. 25, 1928.

P. TEYEN ET AL 1,696,460

POULTRY SPRAYING DEVICE

Filed May 10, 1927

Inventors
Peter Teyen,
Alfred Teyen,

By Clarence A. O'Brien
Attorney

Patented Dec. 25, 1928.

1,696,460

UNITED STATES PATENT OFFICE.

PETER TEYEN AND ALFRED TEYEN, OF POMEROY, IOWA.

POULTRY-SPRAYING DEVICE.

Application filed May 10, 1927. Serial No. 190,212.

This invention relates to new and useful improvements in spraying devices, particularly adapted for use in the spraying of an insecticide upon poultry, the invention aiming to provide a highly novel and simple means for arrangement within the runway of a hen house or the like, and having means operable by the stepping of a fowl thereon to cause the release of the disinfectant from a suitable source of supply, whereupon the same is directed onto the fowl's body.

By reason of the present invention, the poultry may be freed from mites, lice and the like, and this without requiring any hand spraying or any manual labor, and without entailing noticeable expenditure after initial installation.

In the drawing:—

Figure 1:
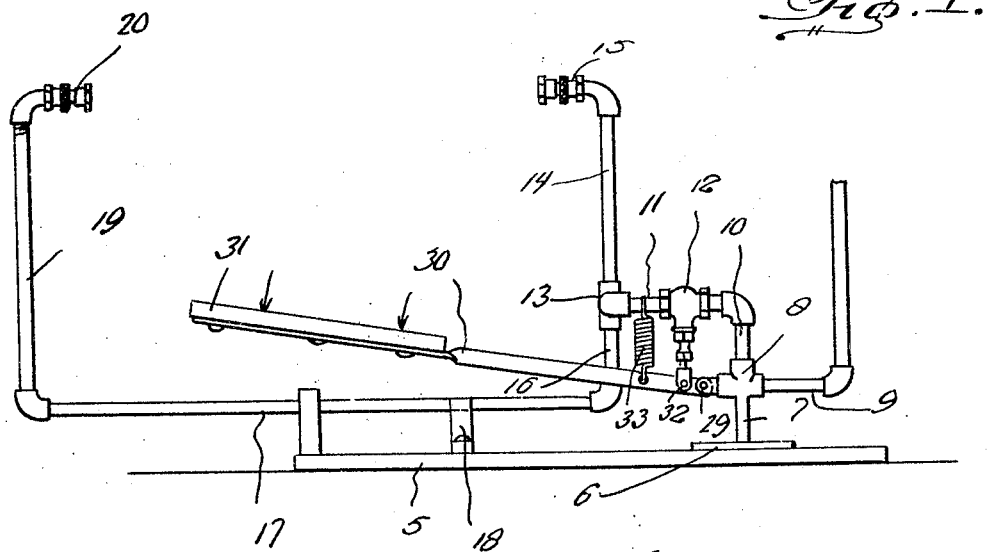
Figure 1 is a side elevation of my improved spraying device.
Figure 2:
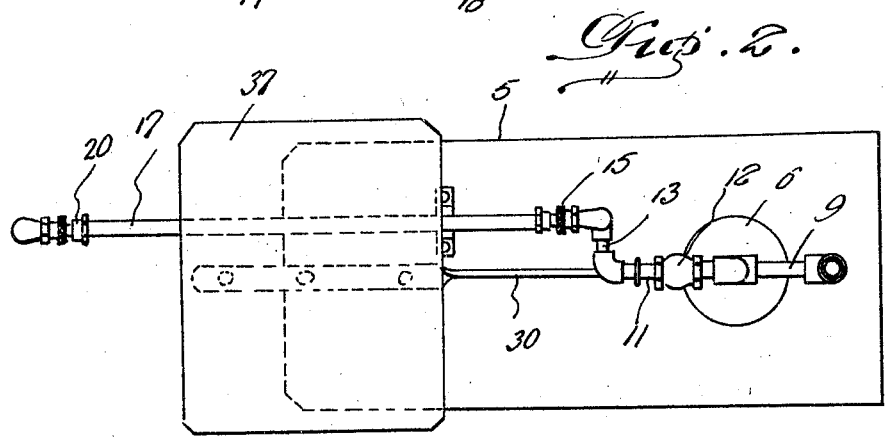
Fig. 2 is a top plan view thereof.

Now having particular reference to the drawing, our spraying device consists of a suitable base board 5 to which is attached a plate 6 equipped with a vertical short standard 7, the upper end of which is constructed to form a T-coupling 8.

The inlet opening of this coupling has communication with a source of fluid disinfectant which may be under pressure, or which may be supported at a higher elevation as desired. Leading from the center fitting of the coupling 8 is a short vertical pipe 10, that has communication with a forwardly extending horizontal pipe 11, within which is arranged a control valve 12 hereinafter more fully described.

Attached to the forward end of the pipe 11 is a T-coupling 13 within the top fitting of which is located a vertically extending pipe 14, upon the upper end of which is a forwardly extending spray nozzle 15 of suitable design. Attached to the lower fitting of this coupling 13 is a depending pipe 16 that has communication at its lower end with a forwardly extending horizontal elongated pipe 17 supported in position above the base 5 by a suitable bracket 18.

Arranged upon the outer end of the pipe 17 is an upwardly extending pipe 19 through the upper end of which is attached an inwardly extending spray nozzle 20, similar to the nozzle 15, and in horizontal alinement therewith.

Figure 3:
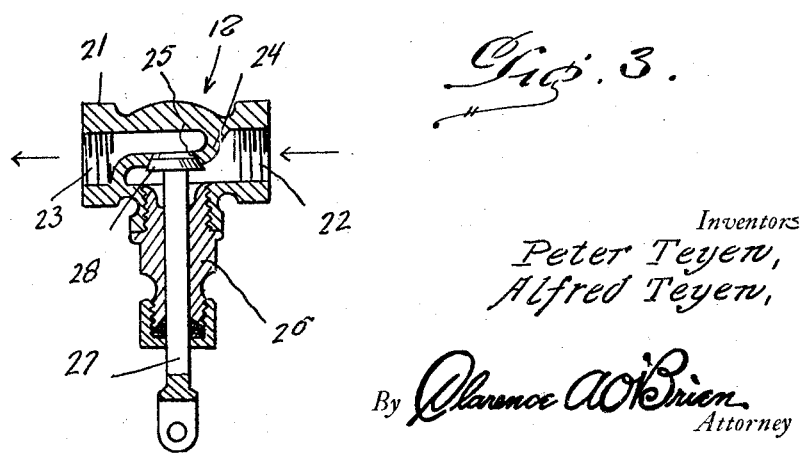
Fig. 3 is a detail section through a particular form of valve employed in conjunction with the present invention.

As clearly indicated in Fig. 3, the valve 12 consists of a T-shaped casing 21 having an inlet and a discharge fitting 22 and 23 extending horizontally between which is the usual partition 24 formed centrally with a tapered valve receiving opening 25. Arranged within the center fitting of this casing 21 is a stem guide 26 movable through which is a stem 27, the inner end thereof being equipped with a tapered disk valve head 28 for engagement within the seat 25 of the valve case partition 24.

Pivoted to the fitting of the T-coupling 8 at the inner side thereof at 29, is a forwardly extending lever 30, the outer end of which is equipped with a platform 31. The lower end of the valve stem 27 is bifurcated at 32 and is pivotally connected to the lever 30 as clearly indicated in Fig. 1. Connecting the lever 30 and the pipe 11 forwardly of the valve 12 is a retractile spring 33 for the purpose of normally raising the lever 30 and platform 31 which maintains the valve 28 in closed position with the valve casing seat 25, cutting off the flow of liquid from the source of supply to the nozzle 15 onto 20.

The device may be arranged within the runway of a hen house, so that the poultry passing through the runway are forced to step upon the platform 31. Obviously, the weight of the fowl will cause the depression of the platform and lever 30 against the action of the spring 31 for opening the valve 28, permitting the disinfectant to be discharged through the nozzles 15 and 20. These nozzles 15 and 20 are so arranged with respect to the platform, as to direct the fluid onto the bodies of the fowl, the height thereof being however such, that the heads of the fowls are untouched, so that the disinfectant will not affect the eyes of the fowl.

It will thus be seen that we have provided a highly novel, simple and efficiently operating spraying device for hen houses and the like, that is well adapted for all of the purposes heretofore designated, and even though we have herein shown and described the invention as consisting of certain detail structural elements; it is nevertheless to be understood that some changes may be made therein, without affecting the spirit and scope of the appended claim.

Having thus described our invention, what we claim as new is:—

In a poultry spraying device of the character described, a U-shaped fluid conductor disposed in a vertical plane inwardly directed elbow couplings on the extremities of the U-shaped conductor, spray nozzles engaged in the elbow couplings to face each other, a pipe extending from one leg of the U-shaped conductor laterally of its plane, a second pipe coupled with the first pipe extending at right angles thereto and at right angles to the legs of the U-shaped conductor and away from said conductor, a valve in the second pipe, a vertical pipe depending downwardly from the second pipe, means for pivotally mounting a lever on the third pipe, a valve in the second pipe operatively connected with an intermediate portion of the lever, a spring attached to the second pipe and engaged with the lever to normally hold the valve closed, and a platform on the outer end of the lever extending through and laterally of the plane of the U-shaped conductor.

In testimony whereof we affix our signatures.

PETER TEYEN.
ALFRED TEYEN.